(12) United States Patent
Salokatve et al.

(10) Patent No.: US 9,046,654 B2
(45) Date of Patent: Jun. 2, 2015

(54) FIBER OPTIC MODE SCRAMBLER AND A METHOD OF MANUFACTURING THEREOF

(71) Applicant: ROFIN-SINAR LASER GMBH, Hamburg (DE)

(72) Inventors: Arto Salokatve, Tampere (FI); Jari Näppi, Tampere (FI)

(73) Assignee: Rofin-Sinar Laser GmbH, Hamburg (DE)

( * ) Notice: Subject to any disclaimer, the term of this patent is extended or adjusted under 35 U.S.C. 154(b) by 0 days.

(21) Appl. No.: 14/391,289

(22) PCT Filed: Mar. 15, 2013

(86) PCT No.: PCT/FI2013/050293
§ 371 (c)(1),
(2) Date: Oct. 8, 2014

(87) PCT Pub. No.: WO2014/091065
PCT Pub. Date: Jun. 19, 2014

(65) Prior Publication Data
US 2015/0086159 A1    Mar. 26, 2015

(30) Foreign Application Priority Data

Dec. 11, 2012  (FI) ...................... 20126288

(51) Int. Cl.
*G02B 6/26*     (2006.01)
*G02B 6/14*     (2006.01)
(Continued)

(52) U.S. Cl.
CPC ............. *G02B 6/268* (2013.01); *G02B 6/125* (2013.01); *G02B 6/14* (2013.01); *G02B 6/02057* (2013.01); *G02B 6/102* (2013.01)

(58) Field of Classification Search
CPC ...... G02B 6/14; G02B 6/1228; G02B 6/0288; G02B 6/305; G02B 6/125; G02B 6/02042; G02B 2006/12152; G02B 2006/12195; H04B 10/2581; H01S 3/06745; H01S 5/1014
USPC ..................... 385/27–29, 32, 37, 43; 156/64
See application file for complete search history.

(56) References Cited

U.S. PATENT DOCUMENTS 4,877,305 A    10/1989  Ricciardelli
5,357,362 A *  10/1994  Azuma et al. ................. 398/134
(Continued)

FOREIGN PATENT DOCUMENTS

JP    S5937503 A    3/1984

OTHER PUBLICATIONS

Zhang et al., "A Long Uniform Taper Applied to an All-Fiber Tm3+ Doped Double-Clad Fiber Laser" Laser Physics 2010, vol. 20, No. 11, pp. 1978-1980.
(Continued)

*Primary Examiner* — Ellen Kim
(74) *Attorney, Agent, or Firm* — Laurence A. Greenberg; Werner H. Stemer; Ralph E. Locher

(57) ABSTRACT

A fiber optic mode scrambler includes a multi-mode optical fiber formed with a core and a cladding around the core and a non-adiabatic cross-sectional shape change zone in the optical fiber. The fiber further has a bending region extending over a length of the optical fiber. The optical fiber has a non-zero curvature at the bending region and a device for maintaining the curvature of the optical fiber at the bending region. Mode scramblers can be provided that are accurately adjusted to match with different desired optical characteristics. A well-controlled manufacturing method for the mode scrambler is also described.

19 Claims, 3 Drawing Sheets

(51) Int. Cl.
*G02B 6/10* (2006.01)
*G02B 6/125* (2006.01)
*G02B 6/02* (2006.01)

(56) References Cited

U.S. PATENT DOCUMENTS

| | | | |
|---|---|---|---|
| 5,708,740 A * | 1/1998 | Cullen | 385/39 |
| 6,295,161 B1 | 9/2001 | Bazzocchi | |
| 6,459,526 B1 | 10/2002 | Minelly et al. | |
| 7,643,707 B2 * | 1/2010 | Koyata et al. | 385/1 |
| 7,945,130 B2 * | 5/2011 | Yan et al. | 385/28 |
| 8,270,787 B2 * | 9/2012 | Sumetsky | 385/28 |
| 8,628,227 B2 * | 1/2014 | Olschowsky et al. | 362/553 |
| 8,811,780 B2 * | 8/2014 | Frigo et al. | 385/32 |
| 2008/0031571 A1 | 2/2008 | Crownover | |
| 2012/0262781 A1 | 10/2012 | Price et al. | |
| 2014/0361452 A1 * | 12/2014 | Zheng | 264/1.24 |

OTHER PUBLICATIONS

Quintela et al.,"Tunable fiber laser using concatenated non-adiabatic single-mode fiber tapers" In Proceedings of 19th International Conference on Optical Fibre Sensors (SPIE 7004), 2008, vol. 7004, p. 700453.

* cited by examiner

FIBER OPTIC MODE SCRAMBLER AND A METHOD OF MANUFACTURING THEREOF

FIELD OF THE INVENTION

The invention relates to fiber optics, in particular a fiber-optic mode scrambler. The invention also relates to a method of mixing or scrambling optical modes in multi-mode optical fibers. The invention can be used e.g. in connection with fiber-delivered high power laser sources, such as fiber lasers.

BACKGROUND OF THE INVENTION

Present day high power laser sources exhibit high quality beams with very high brilliance in the multi-kW power range. For instance, commercial fiber lasers are available with single-mode power of 1 kW and above. Using such high brilliance laser sources in practical applications offers various benefits compared to older generation sources with lower beam quality, such as larger focusing depth and smaller spot size.

However, high brilliance lasers may also give rise to new problems that are not encountered with sources having lower brilliance. A particular problem arises in optics, such as beam collimating and focusing lenses that are used at the output of the laser source to condition the beam for a practical application. The phenomenon behind this problem is called thermal lensing. Physically thermal lensing is caused by spatial and power density dependent variation of the refractive index of the glass material used to construct lenses and other optical elements. Thermal lensing may cause distortions to the output beam, such as power dependent spot size and focal depth variations. Such distortions sometimes make it difficult to control the particular application that the laser is being used for.

One practical example of problems relating to thermal lensing relates to upgrading existing laser sources with new ones. As a manufacturer that uses the laser for an industrial application may exchange an older generation laser source to a higher brilliance new generation laser source, thermal lensing may become a serious issue. Sometimes changing the output optics to better adapt to the laser source is not a viable option due to technical or economical reasons. On the other hand, a laser manufacturer may not want to change the manufacturing chain for the high power laser source to adapt to customer's need for a lower brilliance source.

It is known that optical modes of an optical fiber may be mixed, or to express it more accurately, optical power carried by the optical modes may be redistributed among the modes when a perturbation to the generally cylindrical symmetry of the fiber is produced. A perturbation may be such that the refractive index of the fiber is perturbed, while the geometry of the fiber is preserved. An example of such a perturbation is distributed Bragg reflector that causes mode coupling generally between counter-propagating modes. A localized external pressure may also couple modes with each other through the induced refractive index variation. Fiber bends achieved by e.g. coiling the fiber around a mandrel have been used to produce variation in the effective refractive index of the fiber. However, an efficient mode mixing in such geometries usually require tight coiling radii and/or long lengths of fiber to be used. It may also be that the coiling radius requirement to achieve efficient mode mixing is not practical due to mechanical strength limits of the fiber. Variations to the fiber geometry may also cause mode mixing. Examples of such variations include bulges or other longitudinal translational symmetry breaking features on the fiber. However, the amount of mode mixing by such features is difficult to control.

For the above reasons, among others, there is a need for effective new ways of reducing the brilliance of laser sources in a controlled way to match various customer needs. In particular, such solutions would be needed which are not limited by the mechanical strength properties of the fiber and whose production can be well controlled.

Without directly addressing the present problem in full, JP 59037503 discloses an optical mode scrambler comprising a fiber with three successive biconical taper parts. The biconical parts cause mode conversion and coupling by introducing sections where the core diameter decreases and increases gradually, resulting in a high-performance mode scrambler. A manufacturing method involving pulling of a fiber in heated state is also described. A problem in this kind of design and manufacturing method is that the degree of mode scrambling cannot be accurately controlled due to manufacturing tolerances.

Thus, a problem still remains relating to the controllability and accurate manufacturing of the mode scrambling components.

SUMMARY OF THE INVENTION

It is a goal of the invention to solve at least some of the above-mentioned problems and to achieve an improved fiber-optic mode scrambler. A particular aim is to provide a mode scrambler which can be manufactured in a controlled way to produce the desired degree of mode scrambling.

A secondary aim is to provide a scrambler which can be attached to the output of fiber of a high-brilliance fiber-delivered laser, such as a fiber laser in order to reduce its brilliance.

A further secondary aim is to provide a scrambler component in which power losses are very low.

It is also an aim to provide a method for manufacturing a fiber optic mode scrambler, which meet the requirements of controllability and accuracy.

The invention is based on the idea of providing an optical mode scrambler comprising a modified fiber section with at least one non-adiabatic change of cross-sectional shape in a multi-mode optical fiber, the non-adiabatic shape change causing significant power redistribution between optical modes and therefore mode-scrambling in the fiber, and additionally bending the optical fiber to further adjust the mode-scrambling properties of the fiber. The fiber is "frozen" to a certain shape so that the final product has the desired optical characteristics.

More specifically, the invention is characterized by what is stated in the independent claims.

According to one embodiment, the fiber optic mode scrambler comprises a multi-mode optical fiber comprising a core and a cladding around the core, and at least one non-adiabatic narrowing in the optical fiber. The fiber further comprises a bending region extending over a length of the optical fiber, the optical fiber having a non-zero curvature at the bending region. Additionally, there are provided means for maintaining said curvature of the optical fiber at the bending region in order to "freeze" the configuration of the optical fiber to have desired optical characteristics.

The present method of manufacturing an optical mode scrambler preferably comprises providing an optical fiber having a core and cladding around the core, and providing at least one non-adiabatic narrowing in the optical fiber. Additionally, the method comprises bending the optical fiber on at least one bending region. For achieving the right level of bending, there is provided laser light into the optical fiber simultaneously with said bending, and the characteristics of light passing the at least one bending region is measured. When predefined light characteristics criteria have been reached, the optical fiber is immobilized. As a result, an individually tuned optical mode scrambler is achieved.

The present invention provides significant advantages. It provides a well controllable way of reducing the brilliance of the laser such that the brilliance meets desired level, for example the customer specifications of a laser manufacturer. The reduction in brilliance is achieved by inducing mixing or scrambling of the optical modes that carry the power in the output fiber using both the non-adiabatic changes in the cross section of the fiber and the controlled bending of the fiber.

An advantage of the invention is that neither the non-adiabatic narrowings nor controlled bending cause significant power losses but only power redistribution among the optical modes provided that suitable parameters for the fiber are used. Typically the power losses are less than 1%.

The invention is also suited for fibers designed to carry high power levels from tens of Watts to several kilowatts.

Preferable embodiments are the subject of the dependent claims.

According to one embodiment the at least one non-adiabatic shape-change zone comprises a narrowing. Preferably, there are two or more, for example three, successive narrowings, which together with each other and the bending of the fiber cause the desired level of mode-scrambling.

Preferably, the bending region and the shape-change zone overlap. In other words, the shape-change zone, in particular the narrowing(s) are located at the bending region. Alternatively, the shape-change zone may be entirely or partly located outside the bending region, but this makes the total length of the component larger than if it were within the bending region.

According to one embodiment, the radius of curvature of the optical fiber is at each point of the bending region is more than 50, in particular more than 100 times the diameter of the optical fiber outside the narrowing. Moderate bending ensures that the fiber is not subjected to high mechanical stress and that the cross-sectional shape of the fiber is not significantly deformed by the bending, which would potentially cause unexpected effects, in particular in combination with intentional shape-changes by non-adiabatic mode-scrambling features. Therefore, the main function of moderate or slight bending is to further reduce the translational symmetry of the fiber and thus increase the level of mode mixing in the fiber.

The length of the bending zone can be, e.g. 100 times the outer diameter of the fiber or more, or in absolute terms typically 50 mm or more.

The total angle of curvature may be e.g. 10-90 degrees, i.e., the fiber makes 0.03-0.25 turns in total.

According to one embodiment, the radius of curvature of the optical fiber is constant over the whole bending region, i.e. the fiber follows a circular path.

According to one embodiment, the means for maintaining the curvature comprise a rigid coating or sleeve on the optical fiber at the bending region. The coating or sleeve may be added after the bending or it may be there before that, but only cured or otherwise made rigid when the desired degree of bending has been reached in order to immobilize the bending zone.

According to one embodiment the means for maintaining the curvature comprise an assembly element having shape-maintaining means adapted to receive and immobilize the bending region of the optical fiber. The assembly element by comprise, for example, a plastic support, metallic support or glass support. The shape-maintaining means may comprise a groove or protrusions on the assembly element that is/are capable of holding the fiber in the bent state.

As briefly referred to above, the bending is preferably carried out with simultaneous inspection of the characteristics of light passing the mode scrambler. The characteristics may be indicative for example of the mode-scrambling efficiency of the scrambler and/or the brilliance of light passing the scrambler.

According to one preferred embodiment, during bending the fiber is connected to or integral with a laser source, preferably fiber laser source, used for providing the inspection laser light into the optical fiber. The laser source is preferably the same or similar to that which be used by the end-user with the mode scrambler. In this case, the bending can be controlled in real environment and the resulting beam quality can be very accurately matched with the desired specifications.

These and other embodiments and advantages of the invention will be more specifically discussed in the following detailed description with reference to the attached drawings.

DETAILED DESCRIPTION OF EMBODIMENTS

Definitions

The term "multi-mode optical fiber" refers to an optical fiber capable of carrying simultaneously a plurality of optical modes to be at least partially scrambled by means of the invention. Thus, the multi-mode fiber is understood here in the conventional sense of having a core that supports multiple optical modes. In typical end-user applications, the multi-mode optical fiber according to the invention is coupled to a multi-mode optical source, such as a fiber-laser source. The number of modes guided by a core of a multi-mode fiber can be hundreds. The best performance for the mode scrambler component of the invention is achieved with fibers having a strongly multi-mode character, where the optical mode spacing in propagation constant space is relatively dense, preferably less than $1000 \text{ m}^{-1}$.

A "narrowing" means the combination of two tapers in the optical fiber, namely a down-taper gradually (over a down-taper length) reducing the diameter of the fiber from the original diameter to a value which is less than the original diameter, and an up-taper gradually (over an up-taper length) increasing the diameter back to the original diameter or close to it. In a narrowing, both the core diameter and the cladding diameter are changed along the length of the fiber. The ratio of these diameters may be constant or non-constant over the length of the narrowing.

The term "waist" refers to a section of mode scrambler where the diameter of the narrowing is at minimum. Typically, the narrowing is symmetrical with respect to its waist, i.e., the down-taper and up-taper occur have similar profiles and equal taper lengths.

"Modulation depth" is used to describe how deep the minima or waist diameters in the mode scrambler are in relation to original fiber diameter. For example, modulation depth of 10% means that the waist diameters are 90% of the original fiber diameter. Modulation depth is one parameter experimentally observed to affect the mode scrambling magnitude of the component.

"Non-adiabatic" cross-sectional shape change (e.g. taper) mean features in the outer shape and inner structure of the fiber that are able to cause mode mixing. This requires that the shape changes are steep enough. The criteria for such non-adiabatic tapers are discussed in text books of the art, such as A. W. Snyder and J. D. Love: Optical Waveguide Theory. In short, the adiabatic or slow variation condition is met when the variation of the refractive index profile happens within distance that is large compared to the average beat length between adjacent modes of the fiber. When the variation happens in a shorter distance than the beat length, coupling between the modes occurs, in other words power is redistributed or mixed among the optical modes of the fiber.

Structure

Figure 1A:
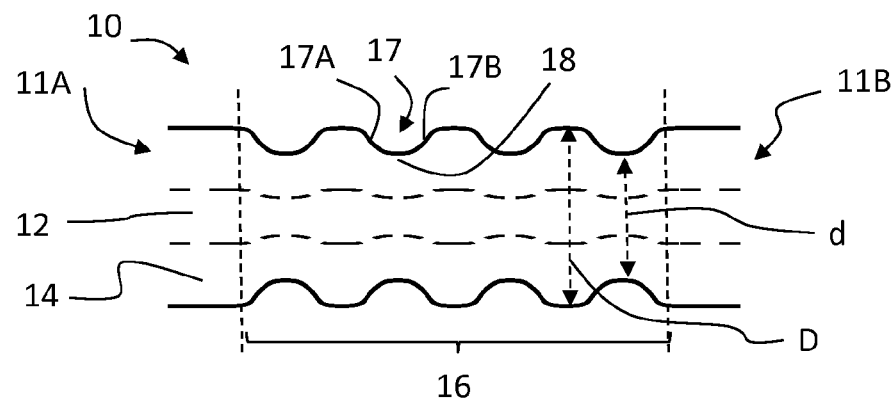
FIGS. 1a and 1b show in cross-sectional views the exemplary structures of a mode scrambler according to one embodiment of the invention in non-bent and bent state, respectively.

With reference to FIG. 1a, showing a fiber optic mode scrambler according to the invention but in a still non-bent state, the multi-mode optical fiber 10 comprises a multi-mode core 12 and a cladding 14. The multi-mode fiber has an input end 11A and an output end 11B. Between the input and output ends 11A, 11B, there is a processed section 16, i.e. the non-adiabatic cross-sectional shape-change zone, that has at least one narrowing 17 formed by a down-taper 17A from the original diameter D of the fiber and up-taper 17B from the diminished diameter d back to the original diameter D of the fiber. The down and up-tapers 17A, 17B are applied to the diameter of the fiber 10 as a whole, meaning that the tapering is effected to the fiber core 12 and cladding 14 simultaneously. Between the tapers 17A, 17B, there is a waist 18.

The modulation depth may be e.g. 5-30%, in particular 5-15%.

The degree of taperings and the number of narrowings 17 in the processed section of the component can be freely chosen in the non-adiabatic region to produce roughly the desired mode scrambling efficiency. The pitch, i.e. separation between successive waists, is typically 0.5-5 mm, in particular 1-3 mm. The number or waists may be e.g. 1-100, preferably 2-20.

Figure 1B:
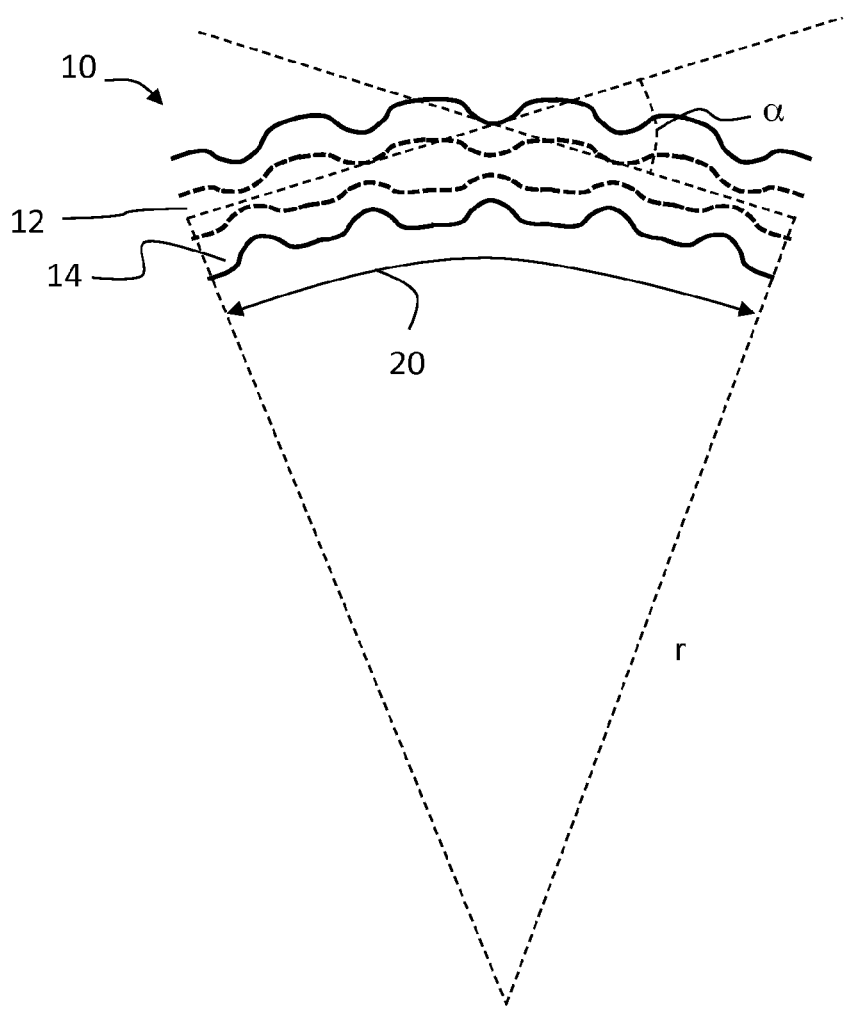

Now with reference to FIG. 1b, the processed section is bent to an angle α, the radius of curvature being r. The radius of curvature r may be e.g. 100-1000 times the diameter D. Angle α may be e.g. 10-90 degrees. It should be noted that no steep curvatures are generally needed, since the bending functions as a "fine-tuning" of the optical characteristics of the already mode-scrambling fiber, and thus only a slight bending is generally effective in further reducing the brightness of radiation propagating through the fiber to a desired level.

In a typical situations, the desired mode-scrambling efficiency is achieved with coarse tuning using a shape change zone having 2-20 narrowings each having a modulation depth of 5-30% and fine-tuning by bending the fiber at the region of the shape change zone by 10-90 degrees such that the radius of curvature at each point of the bending region remains 100 times the diameter D of the fiber or more.

It should be noted that the shape of the bent fiber can vary. The curvature can be, but needs not be constant over the whole bending region. The bending region may take any symmetric or non-symmetric shape. Examples include circular, parabolic, elliptic and meandering shapes.

It should also be noted that the non-adiabatic cross-sectional shape-change zone and the bending region can, but need not have similar lengths or overlap with each other. According to one embodiment, the bending region is longer than the cross-sectional shape-change zone. In an alternative embodiment, the bending region is shorter than the shape-change zone.

Figure 2:
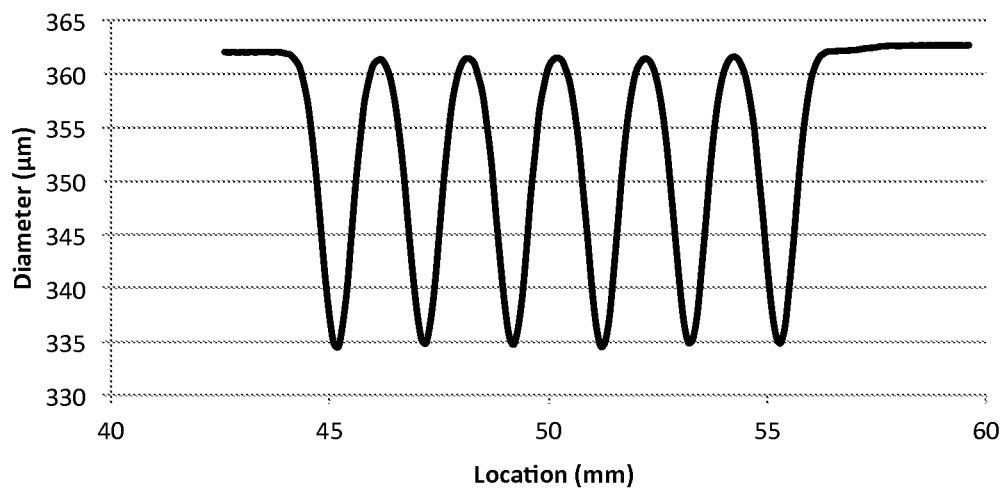
FIG. 2 illustrates a measured thickness profile along a fiber according to one embodiment of the invention.

FIG. 2 shows a measured thickness profile of one embodiment of the mode scrambler component, showing six waists of about 7.7% modulation depth and a pitch of about 2 mm. The mode scrambler component of FIG. 2 has been drawn into an optical fiber having 363 μm cladding diameter and 100 μm core diameter.

According to one embodiment, the fiber is an all-glass fiber. Although a general term glass is used here, it usually refers to fused silica or doped forms thereof.

Figure 3:
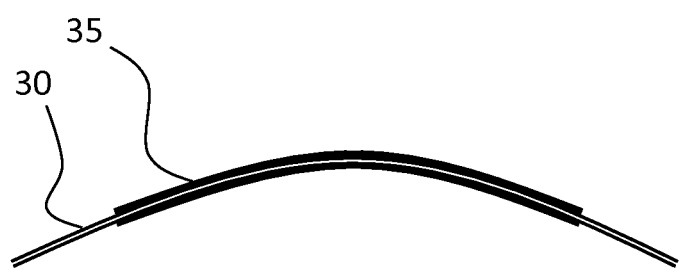
FIG. 3 shows a schematic view of an immobilized mode scrambler fiber according to one embodiment of the invention.

In addition to the fiber described above, the present mode scrambler comprises means for immobilizing the fiber to the bent state. These may include a rigid coating 35 around the processed and bent fiber 30, as disclosed in FIG. 3. Examples of coating materials include epoxies, urethanes, silicones or acrylates.

Instead of or in addition to of a coating, the fiber may be immobilized by various other ways. These include e.g. affixing the fiber to an assembly element having means for receiving and holding the fiber in the desired shape, embedding the fiber into a layer of material by casting or potting, and gluing the fiber to a suitable rigid base.

Figure 4:
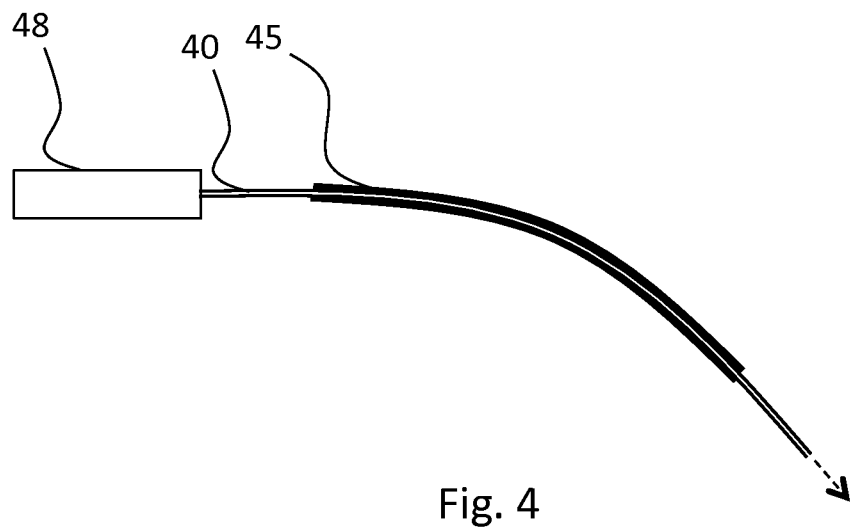
FIG. 4 shows a mode scrambler according to FIG. 3 connected to a laser source.

FIG. 4 shows a scrambler fiber 40 immobilized with a coating 45 connected to a laser source 48. Although illustrated herein as a rectangular box, it should be noted that the laser source 48 may also be a fiber laser seamlessly spliced to the input end of the scrambler fiber. The laser source 48 and the mode scrambler may be integrated into a single package or they may be packaged separately and optically connected with each other.

Method of Manufacture

The method of manufacturing according to one embodiment of the invention comprises providing a length of multi-mode fiber, stripping the potential original outer coating off from a section of the fiber, making the processed section inside the stripped section by a fiber drawing method, bending the processed section to a desired degree, and optionally re-coating or immobilizing with some other means the processed section.

According to a further embodiment, the method comprises cleaving the input and output ends of the fiber, and, optionally, splicing the input end of the component to the output fiber of a laser source.

The processed section, i.e. the non-adiabatic tapers, can be manufactured by a fiber drawing method comprising heating the fiber locally inside the stripped section to make the material of the fiber soft, and pulling the fiber to produce the tapers while simultaneously moving the heated zone along the longitudinal axis of the fiber. Such methods are known per se in the art. In drawing, both the fiber cladding and core experience the same relative reduction in their diameters within the taper profile when compared to their original diameters of the un-tapered fiber. In practice, a non-adiabatic narrowing can be achieved by fast acceleration and deceleration of fiber drawing while the heat zone is slowly moved along the fiber. The number of narrowings and the modulation depth can be easily controlled to good accuracy by adjusting fiber-drawing parameters. Generally speaking, the level of control, accuracy and reproducibility of fiber drawing are all very good.

Figure 5:
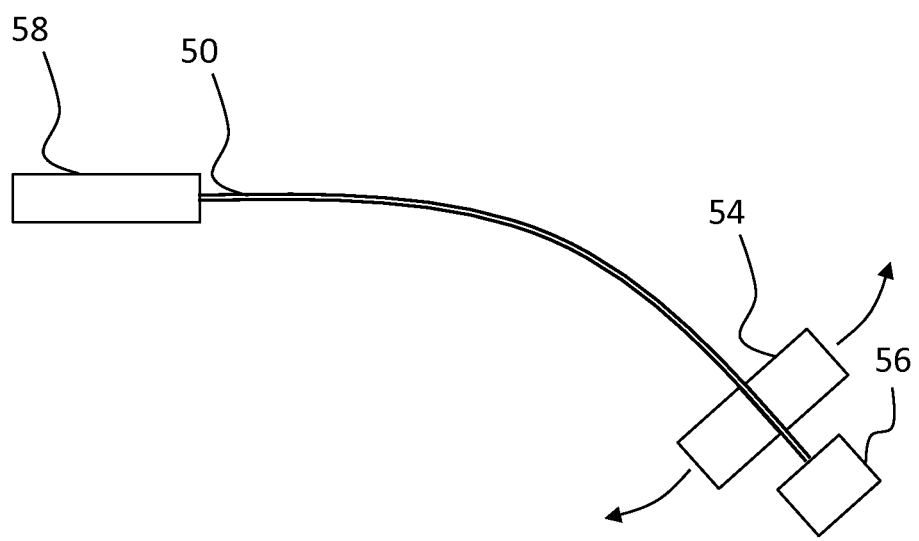
FIG. 5 shows schematically an exemplary manufacturing setup.

With reference to FIG. 5, showing a processed fiber 50 to be bent, the bending can be carried out as follows. The fiber 50 is connected to a laser source 58 continuously providing preferably constant laser light to the input end of the fiber 50 and through the processed section thereof. At the other side of the processed section, there are provided bending means 54, which are adapted to grab and move the fiber 50 to different bending angles. At the output end of the fiber 50, there is a laser detector 56 adapted to measure the properties, such as brilliance, of the laser light exiting the fiber 50. When the brilliance is at a desired level, i.e. desired amount of mode scrambling occurs inside the fiber 50 between its input and output end, the bending is stopped and the fiber is immobilized in corresponding geometrical configuration.

The invention claimed is:

1. A fiber optic mode scrambler, comprising:
   a multi-mode optical fiber formed of a core and a cladding around said core;
   a non-adiabatic cross-sectional shape change zone in said optical fiber;
   a bending region extending over a length of said optical fiber, said optical fiber having a non-zero curvature at said bending region; and
   a device for maintaining said curvature of said optical fiber at said bending region.

2. The mode scrambler according to claim 1, wherein said shape change zone is at least partially located within said bending region.

3. The mode scrambler according to claim 1, wherein said shape change zone is entirely located within said bending region.

4. The mode scrambler according to claim 1, wherein said non-adiabatic shape change zone comprises at least one narrowing of optical fiber.

5. The mode scrambler according to claim 4, wherein said at least one narrowing of optical fiber is one of a plurality of successive narrowings.

6. The mode scrambler according to claim 1, wherein a radius of curvature (r) of said optical fiber at each point within said bending region is more than 50 times a diameter (D) of said optical fiber.

7. The mode scrambler according to claim 1, wherein a radius of curvature (r) of said optical fiber is constant over an entire said bending region.

8. The mode scrambler according to claim 1, wherein said device for maintaining the curvature comprises a rigid coating or sleeve on said optical fiber at said bending region.

9. The mode scrambler according to claim 1, wherein said device for maintaining the curvature comprises an assembly element having a shape-maintaining means adapted to receive and immobilize the bending region of the optical fiber.

10. The mode scrambler according to claim 1, wherein said device for maintaining the curvature comprises a rigid base member to which said optical fiber is potted or glued.

11. The mod scrambler according to claim 9, wherein said optical fiber is potted or glued to said rigid base member with a material selected from the group consisting of epoxy, urethane, silicone and acrylate.

12. The mode scrambler according to claim 1, wherein said shape change zone comprises a plurality of narrowings having a modulation depth of 5-30% and a total angle of curvature of said bending region is between 10 and 90 degrees.

13. A method of manufacturing an optical mode scrambler, comprising:
   providing an optical fiber having a core and cladding around the core;
   providing at least one zone capable of causing non-adiabatic optical mode mixing of multi-mode light travelling in the optical fiber;
   bending the optical fiber on at least one bending region;
   simultaneously with the bending, injecting laser light into the optical fiber and measuring characteristics of the light passing the at least one bending region; and
   when a predefined light characteristic has been achieved, immobilizing the optical fiber at the bending region so as to form a tuned optical mode scrambler.

14. The method according to claim 13, wherein the light characteristic is one or more criteria selected from the group consisting of mode-scrambling efficiency and brilliance.

15. The method according to claim 13, wherein the immobilizing step comprises adding a rigid coating or sleeve around the optical fiber at the bending zone or mounting the optical fiber to an assembly element capable of maintaining the shape of the optical fiber at the bending region.

16. The method according to claim 13, which comprises injecting the laser light into the optical fiber from a laser light source connected to or integral with said optical fiber.

17. The method according to claim 16, wherein the laser source is a fiber laser source.

18. The method according to claim 13, wherein the at least one zone and the at least one bending region are formed to at least partially overlap.

19. The method according to claim 13, wherein the immobilizing step comprises one or more of the following:
   providing the optical fiber with a rigid sleeve capable of maintaining the shape of the fiber;
   mounting the optical fiber to an assembly element having a shape-maintaining device for the optical fiber; and
   gluing or potting the optical fiber to a base member with a glue or potting material.

* * * * *